Patented Oct. 16, 1934

1,976,905

UNITED STATES PATENT OFFICE 1,976,905

INSECTICIDE AND FERTILIZER AND METHOD OF MANUFACTURE

William Thordarson, New York, N. Y.

No Drawing. Application February 4, 1933, Serial No. 655,247

17 Claims. (Cl. 167—14)

This invention relates to improvements in insecticides, fungicides and fertilizers produced particularly from waste sulphite liquor.

An object of this invention is to provide a new line of chemical compounds of insecticidal and fungicidal properties produced from waste sulphite liquor.

Another object of this invention is to produce a new fertilizer from waste sulphite liquor.

Another object of this invention involves novel methods of procedure by means of which such insecticides and fungicides may be produced from waste sulphite liquor.

These and many other objects, as will appear from the following disclosure, are successfully secured by means of the products and methods of this invention.

This invention resides substantially in the steps and series of steps, comprising the methods thereof, and the products produced thereby.

It is of course common knowledge in the chemical industry that waste sulphite liquor, which is annually produced in large quantities, has found little utilization in industry. Considerable thought and effort have been spent in attempting to devise methods and ways of utilizing waste sulphite liquor itself and to produce useful products therefrom. These attempts in general have not been successful and, as a result, vast quantities of sulphite liquor, which, because of the lack of use therefor, has been termed "waste sulphite liquor", are produced annually not only have no utility but provide a troublesome problem when it comes to the disposal thereof. Waste sulphite liquor is of course produced by the sulphite cooking process for the treatment of wood in the manufacture of paper and the like. A $CaHSO_3$ solution containing free sulphurous acid, $H_2SO_3$, is used to extract the lignin away from the cellulose in wood chips. This leaves cellulose which forms the basis of paper manufacture and the calcium ligno-sulphonate, sugars, etc. are drained from the cellulose and form "waste sulphite liquor".

The general object of this invention is to provide a novel process for the treatment of waste sulphite liquor for the production of useful products and particularly insecticides and fungicides. Because waste sulphite liquor is a drug on the market it is naturally of little value and hence lends itself to the cheap production of products therefrom. It is ideally cheap therefore as a source of insecticides to be used in the treatment of foliage, soil and the like for the purpose of killing insects, worms and the like which are destructive of foliage and soil.

The ideal insecticide for this purpose must be cheap and is desirably produced from raw materials which are available in large quantities at low cost. It must be toxic to insects, but on the other hand, must be non-toxic to plants, foliage and animals. In order to be non-toxic it should contain no soluble poison, such as arsenic. A good insecticide is preferably adapted to colloidal suspension in spraying solutions and should be highly adhesive so as to adhere to the surfaces upon which it is applied which is usually accomplished by spraying.

The insecticide and fungicide of this invention meets all the above noted requisites of a practical useful and inexpensive insecticide.

Waste sulphite liquor as produced is acidic and its approximate proportional contents are 90% water and 10% solid. When it is intended to adapt waste sulphite liquor to such limited uses as there are for it, it is common practice to evaporate some of the water content therefrom so that it then contains about 50% water and 50% solid. This evaporation is usually effected as a matter of economy in order to reduce the bulk of the liquid for the purpose of reducing the cost of handling and shipping it. The evaporation treatment does not reduce the acidity of the liquor, but, on a proportional basis, obviously increases it. The method of this invention may employ the waste sulphite liquor either in the form in which it is produced or in its evaporated form. The economics of the problem will, of course, determine which form is employed. If this method is carried out at the source of the liquor, evaporation can be dispensed with because it is a relatively expensive operation.

In any event the liquor, as employed in this process, must be neutral and it is preferably neutralized by the use of a suitable hydroxide or neutralizing agent, such as sodium hydroxide, potassium hydroxide, ammonium hydroxide, and the like.

White arsenic, $As_2O_3$, is dissolved by boiling in an equivalent quantity of an aqueous solution of a hydroxide of the alkali metals, such as sodium hydroxide, potassium hydroxide, and the like. The reaction of this mixture results in the production of normal sodium arsenite; $Na_3AsO_3$. The reaction equation is: $6NaOH + As_2O_3 = 3H_2O + 2Na_3AsO_3$. Of course it is within the scope of this invention to employ some other equivalent of arsenic in the above step. When the arsenic and hydroxide are mixed the reaction to produce the neutral arsenite is preferably carried out by boiling the solution until the reaction is completed and then allowing it to cool to room temperature.

At this point it should be noted that there are many equivalents of the poisonous ingredient of the compound when producing an insecticide and fungicide. In place of the arsenic, other toxic elements may be employed. It should be noted, however, that the process or method of compounding the final product is the same. For example, in the above process, instead of using normal sodium arsenite, the following compounds can be employed:

Sodium arsenate _____ $Na_3AsO_4$
Sodium fluosilicate _____ $Na_2SiF_6$
Sodium borate _____ $Na_3BO_3$
Sodium fluoborate _____ $NaBF_4$
Sodium antimonite _____ $NaSbO_2$
Sodium antimonate _____ $NaSbO_3$
and
Sodium fluoride _____ $NaF$ It should also be noted that other than sodium compounds of these anions may be employed, as for example any alkali salt of the above anions. Thus it is possible to use potassium arsenate, cæsium arsenate, lithium arsenate, and rubidium arsenate.

A suitable soluble metal salt is then dissolved in water. Examples of a suitable metal salt within the scope of this invention are iron sulphate, copper sulphate, lead nitrate, calcium chloride, zinc sulphate, magnesium sulphate, mercury chloride, and the like. In fact any suitable soluble metal salt may be employed, although the soluble salts of the alkali metals cannot be used. It should be noted that when a salt of copper or mercury is employed, the resulting product has increased fungicidal properties.

Either the normal sodium arsenite solution or the iron sulphate solution is then added to the neutralized waste sulphite liquor in equivalent proportions to produce an intermediate solution. The two are preferably thoroughly mixed at room temperature. It seems to make no difference whether the normal sodium arsenite or the iron sulphate is first mixed with the waste sulphite liquor. When $Na_3AsO_3$ is first added to waste sulphite liquor, the calcium or magnesium present in the waste liquor precipitates out; to avoid this, when desired, add the metal salt solution to the waste sulphite liquor.

As the next step in the procedure, either the metal salt such as iron sulphate or the normal sodium arsenite, is then added to the intermediate mixture resulting from the addition of the sodium arsenite or the iron sulphate to the waste sulphite liquor. In other words, if the sodium arsenite is first added to the waste sulphite liquor then the iron sulphate is added to the resulting mixture, or the reverse operation is carried out where the iron sulphate is first added to the waste sulphite liquor and then the sodium arsenite is added to the intermediate mixture. In either event, this step of addition to the intermediate mixture is accompanied with rapid stirring and the addition is made in equivalent proportions. The result of this admixture of ingredients is the production of an insoluble precipitate which is a heretofore unknown compound which may be generically termed a metal lignin sulphonate arsenite. With the particular ingredients recited above, it is apparent that the resulting insoluble precipitate is an iron lignin sulphonate arsenite. The above admixture and rapid stirring is carried out at room temperature.

The reaction equation for the above step is as follows:

$$3FeSO_4 \cdot 7H_2O + Na_3AsO_3 + 3Na(O\ org) \underset{\text{sodium ligno sulphate}}{\rightarrow}$$
$$Fe_3AsO_3(O\ org)_3 + 3Na_2SO_4 + 21H_2O$$

In addition to the production of the iron lignin sulphonate arsenite, sodium sulphate is formed which has the important function of "salting out" the iron lignin sulphonate arsenite. In order to precipitate the iron lignin sulphonate arsenite out of the solution, which could not otherwise be usually filtered therefrom, it would be necessary to salt it out by the addition of considerable quantities of a suitable salt. However, in the normal reaction which occurs sufficient salt, which in this case is sodium sulphate, is produced to effect the salting out action desired.

The solution is then filtered in a continuous filter and the iron lignin sulphonate arsenite precipitate is thus separated from the solution. The resulting precipitate is then dried in an oven at a comparatively low temperature, using warm air. The residue from the filtration may be used as a paste without further drying, if desired.

The dried precipitate is then preferably ground to as fine a powder as possible in a suitable grinding machine, such as a ball mill. The reduction of the product to an impalpable powder, aids the compound in exercising its natural colloidal properties when suspended in water in which it is embodied to provide a spraying solution in accordance with the usual method of applying insecticides. This product forms the insecticide and fungicide of this invention, and, as above noted, may be generically termed a metal lignin sulphonate arsenite.

The property of insolubility of the arsenic in the product is very important because this prevents its burning foliage to which it is applied. The property of forming a colloidal solution with water is important, because it aids in its application by spraying, and when applied to the soil, disperses thoroughly throughout the soil without flocculating it and hence is not injurious to it. The product of this invention, containing no soluble arsenic, is non-toxic to plants. All of the arsenic goes into combination so that there is no free soluble arsenic in the final product.

For a given quantity of iron sulphate solution the relative proportions of the sodium arsenite and the sulphite liquor may be varied. Thus, if the quantity of sodium arsenite is reduced and the quantity of sulphite liquor correspondingly increased, the same reactions result. Of course, the reverse is true where the quantity of sulphite liquor may be decreased and the quantity of sodium arsenite correspondingly increased. In order to accomplish this it is necessary to form basic salts of the metal lignin sulphonate arsenite by the addition of a hydroxide of an alkali metal, such as sodium hydroxide, in equivalent proportion to the decrease in alkali metal lignin sulphonate. At this point the solution should be slightly alkaline to litmus paper.

A reaction formulae which illustrates the variability of the relative proportions of the sodium arsenite and the sulphite liquor is as follows:

$$3FeSO_4 \cdot 7H_2O + Na_3AsO_3 + 2Na(O\ org) + NaOH \rightarrow$$
$$Fe_3AsO_3(O\ org)_2OH + 3Na_2SO_4 + 21H_2O$$

By comparing this equation with the preceding similar equation, this variability will be apparent to those skilled in the art.

The reaction which takes place in accordance with the method of this invention insures a 100% precipitation of the arsenic with the result that the product does not burn foliage to which it is applied.

When making a fertilizer, instead of employing a poisonous agent, such as normal sodium arsenite and the other equivalents thereof as described above, a non-toxic agent may be employed which is a plant food. Therefore, instead of making normal sodium arsenite or its equivalents into the intermediate mixture, sodium phosphite, $Na_3PO_3$ or sodium phosphate, $Na_3PO_4$ may be used. The end product will then be a fertilizer which may generally be termed a metal lignin sulphonate phosphite or phosphate. The method of producing the fertilizer is the same as described in detail above, except with the substitution noted.

It will be seen as a general consideration that by changing from what might be termed a toxic ingredient to a non-toxic ingredient, the end product will be either an insecticide or a fertilizer. In view of the fact that no general term is available to broadly define the compound of this invention, which may be either toxic or non-toxic, the final ingredient will be termed a "modifying agent." Hence, in the following claims a modifying agent will be employed to include arsenic and its equivalents, or phosphorus and its equivalents. It is intended therefore when the term "modifying agent" is employed in the claims, to include either a poisonous or non-poisonous ingredient, or a toxic or non-toxic ingredient as exemplified by arsenic or phosphorus respectively, or their equivalents.

The name insoluble metal lignin sulphonate double salt, is suggested as a suitable generic term to include both the insecticide and fertilizer end product precipitate of this invention.

From the above description it will be apparent I have produced an entirely new line or series of compositions of matter and a novel method of compounding the same which may be varied by those skilled in the art without departure from the scope of this invention. I do not therefore, desire to be strictly limited to the disclosure as given for purposes of illustration, but rather to the scope of the appended claims.

What I seek to secure by United States Letters Patent is:

1. As a new compound, a metal lignin sulphonate arsenite.

2. As a new compound, a metal lignin sulphonate arsenate.

3. As a new compound, a metal lignin sulphonate phosphate.

4. As a new compound, iron lignin sulphonate arsenite.

5. As a new compound, iron lignin sulphonate arsenate.

6. As a new compound, calcium lignin sulphonate phosphate.

7. As a new compound, a metal lignin sulphonate in combination with a toxic anion.

8. The method of producing an insecticide including the steps of mixing waste sulphite liquor and a solution of normal sodium arsenite to produce an intermediate mixture and adding a soluble metal salt (excluding soluble salts of alkali metals) to produce an end product precipitate, whereby the hydrogen ion concentration of the final solution is substantially neutral.

9. The method of producing an insecticide and fertilizer including the steps of mixing waste sulphite liquor and a soluble metal salt (excluding soluble salts of alkali metals) in equivalent proportions to produce an intermediate mixture and adding an equivalent quantity of an anion to produce an end product precipitate, whereby the final solution is substantially neutral.

10. The method of producing an insecticide including the steps of mixing neutral waste sulphite liquor and a solution produced by the admixture of arsenic and a hydroxide of the alkali metals to provide an intermediate mixture and adding a soluble metal salt (excluding soluble salts of alkali metals) to produce an end product precipitate.

11. The method of producing an insecticide including the steps of mixing neutral waste sulphite liquor and a solution produced by the admixture of arsenic and a hydroxide of the alkali metals to provide an intermediate mixture and adding with a rapid stirring at room temperature, a soluble metal salt (excluding soluble salts of alkali metals) to produce an end product precipitate.

12. The method of producing an insecticide which comprises dissolving white arsenic or its equivalent in an equivalent quantity of an aqueous solution of a hydroxide of the alkali metals, boiling the solution until the reaction is complete, adding this solution to neutralized waste sulphite liquor and finally adding a solution of a soluble metal salt (excluding soluble salts of alkali metals) to produce a metal lignin sulphonate arsenite precipitate.

13. The method of producing a fertilizer and insecticide which includes the steps of mixing neutralized waste sulphite liquor with sodium phosphate and then adding a solution of a soluble metal salt (excluding soluble salts of alkali metals) to produce a metal lignin sulphonate phosphate precipitate.

14. As a new compound, insoluble metal lignin sulphonate double salt.

15. The method of producing an insecticide or a fertilizer including the steps of mixing neutralized sulphite liquor and a solution of a soluble metal salt (excluding soluble salts of alkali metals) and then adding to the mixture a suitable ionizable chemical compound to produce an end product precipitate.

16. The method of producing an insecticide including the steps of mixing neutralized waste sulphite liquor and a soluble metal salt (excluding soluble salts of alkali metals) in equivalent proportions to produce an intermediate mixture and adding a toxic anion to produce an end product precipitate.

17. The method of producing a fertilizer including the steps of mixing neutralized waste sulphite liquor and a soluble metal salt (excluding soluble salts of alkali metals) in equivalent proportions to produce an intermediate mixture and adding a non-toxic anion to produce an end product precipitate.

WILLIAM THORDARSON.

CERTIFICATE OF CORRECTION.

Patent No. 1,976,905.　　　　　　　　　　　　　　　　October 16, 1934.

WILLIAM THORDARSON.

It is hereby certified that error appears in the printed specification of the above numbered patent requiring correction as follows: Page 2, line 82, middle line of equation, for "sulphate" read sulphonate; and that the said Letters Patent should be read with this correction therein that the same may conform to the record of the case in the Patent Office.

Signed and sealed this 8th day of January, A. D. 1935.

(Seal)
　　　　　　　　　　　　　　　　　　　　Leslie Frazer
　　　　　　　　　　　　　　　　Acting Commissioner of Patents.